M. MOLITOR.
CHECK ROW SEEDER.
APPLICATION FILED JAN. 2, 1913.
1,070,510.
Patented Aug. 19, 1913.
2 SHEETS—SHEET 1.
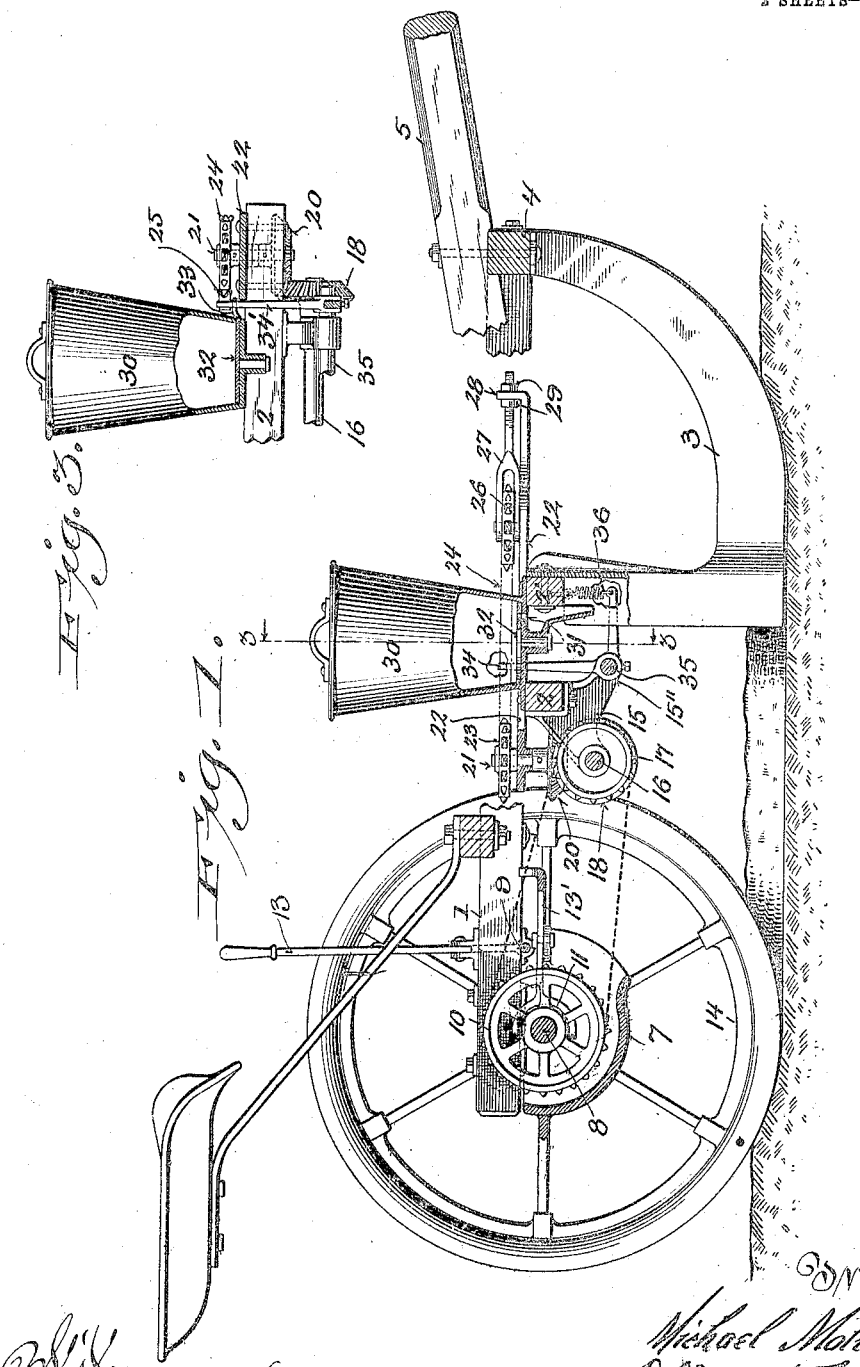

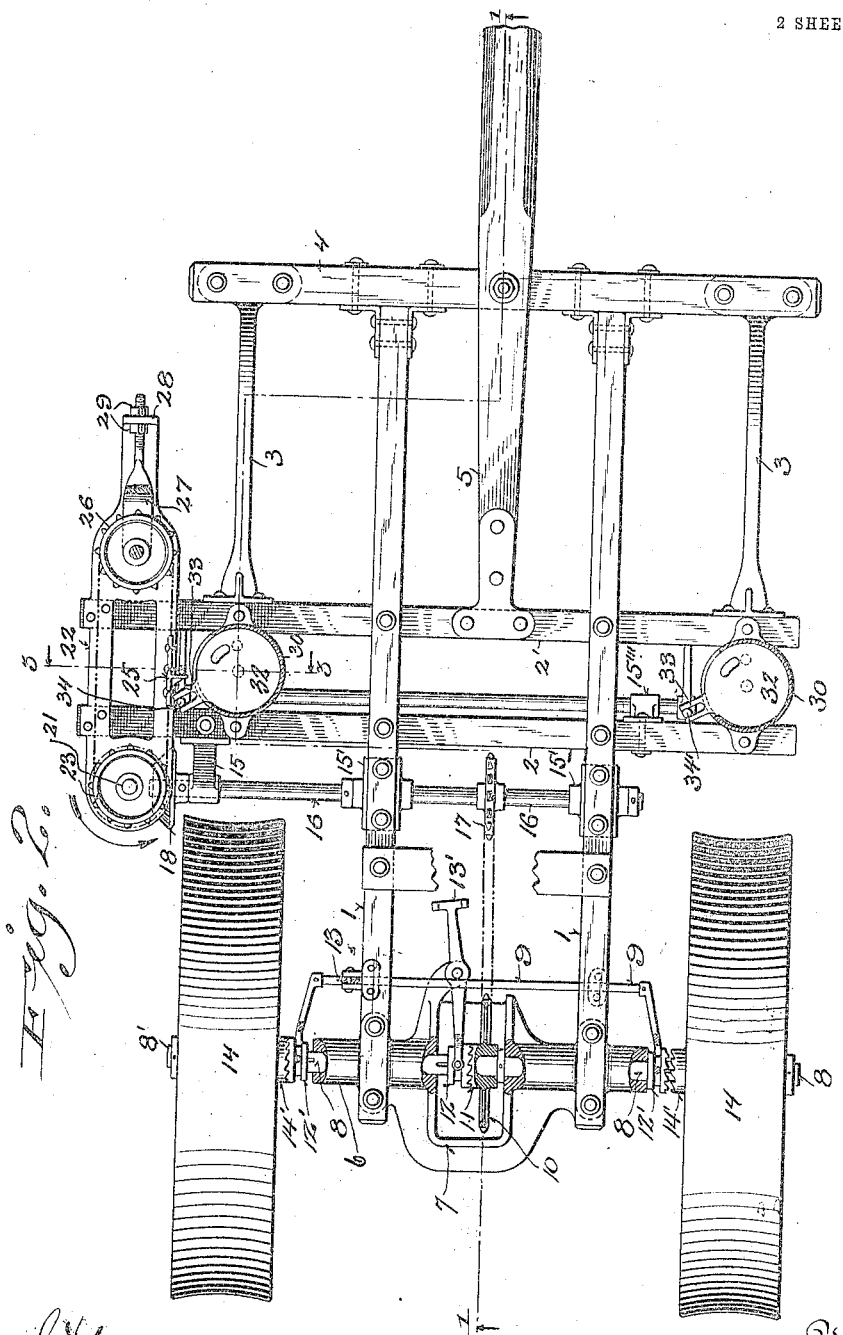

UNITED STATES PATENT OFFICE.

MICHAEL MOLITOR, OF CALVARY, WISCONSIN.

CHECK-ROW SEEDER.

1,070,510.  Specification of Letters Patent.  Patented Aug. 19, 1913.

Application filed January 2, 1913. Serial No. 739,805.

*To all whom it may concern:*

Be it known that I, MICHAEL MOLITOR, a citizen of the United States, and resident of Calvary, in the county of Fond du Lac and State of Wisconsin, have invented certain new and useful Improvements in Check-Row Seeders; and I do hereby declare that the following is a full, clear, and exact description thereof.

My invention refers to seeders, its primary object being to provide a simple, economical and effective self-contained check-row feed mechanism for such machines, whereby fixed wires stretched across the field may be dispensed with.

Another object of my invention is to provide means for varying the distance between feed points.

Still another object of my invention is to provide means for shifting the driving power from one traction wheel to the other of the machine in instances where the traction wheel driving the feed mechanism is traveling in the line of a hummock or depression which would thus disarrange the timing of the feed.

With the above and other minor objects in view the invention consists in certain peculiarities of construction and combination of parts as hereinafter set forth with reference to the accompanying drawings and subsequently claimed.

In the drawings Figure 1 represents a longitudinal sectional elevation of a seeding machine embodying the features of my invention; Fig. 2, a plan view of the same with parts broken away and in section to more clearly illustrate structural features, and Fig. 3, a detailed cross section of the feed mechanism, the section being indicated by line 3—3 of Fig. 1.

Referring by characters to the drawings, 1, 1, represent parallel longitudinal beams of a truck-frame having parallel transverse beams 2, 2′. The front transverse beam 2′ has attached thereto the usual feeder knees 3, which knees in turn are connected at their upper ends by a reach-bar 4, there being a suitable tongue member 5 connected to said reach-bar and adjacent beams 1. Secured to the rearward portion of the truck beams 1 is an axle housing 6, which housing is provided with a centrally disposed open gear-casing 7. Journaled in the housing 6 is an axle 8 having loosely mounted thereon and within the gear-casing 7 a driving sprocket-wheel 10, the hub of which at one end is formed with clutch teeth 11 that are adapted to engage a clutch-collar 12, which clutch-collar is in spline connection with the axle and is provided with an annular groove for the reception of a spanner lever 13′, which lever is suitably fulcrumed to a lug extending from the gear-casing 7 and is adapted to effect a clutching engagement between the driving sprocket and said axle 8. Loosely mounted upon the ends of the axle 8 are the usual traction wheels 14 having clutch-faced hubs 14′, which hubs are arranged to be engaged by clutch-collars 12′ that are in splined connection with the axle shaft. The said clutch-collars 12′ are grooved for the reception of spanner arms that constitute part of a yoke-bar 9 that is mounted in suitable bearings extending from the truck-frame beams 1, 1. The yoke-bar is arranged to be reciprocated by a hand-lever 13, which lever is fulcrumed to an ear that extends from one of the truck-frame beams 1 and is suitably connected to the yoke. By this arrangement of gearing in connection with the axle it is apparent that one or the other of the drive-wheels 14 may be coupled to the axle by manipulation of the lever 13′, it also being apparent that by manipulation of the lever 13 its connected clutch member can be thrown into gear with the driving sprocket-wheel 10 or disconnected therefrom.

Mounted in suitable bearing-brackets 15 15′ that extend from the frame-beams, is a transversely disposed driven-shaft 16, which shaft carries a sprocket-wheel 17 that is in link-belt connection with the sprocket-wheel 10. To the end of this shaft is secured a beveled gear-wheel 18 which meshes with a corresponding beveled gear-wheel 20 that is mounted upon a vertically disposed stud 21, the same being journaled in a horizontally arranged table 22 that is suitably secured to the end of the cross-beams 2, 2′. The stud 21 also carries a sprocket-wheel 23 that is revolubly arranged upon the upper surface of the table and is fitted with an endless chain-belt 24 having links spaced at predetermined intervals that are provided with spur extensions 25, the opposite end of the link-belt being supported upon an idle sprocket-wheel 26, a stud of which is journaled in a hanger 27, as best shown in the plan view. The hanger has a screw-threaded shank which is mounted in an apertured ear 28 that extends from the table, and through which the shank of the hanger is adjustably fitted and held by suitable nuts 29. Hence it is apparent that should it be desired to add or subtract a link of the chain, it can be readily effected, the said chain-belt being thereafter drawn taut by the hanger connection of the idle sprocket.

Mounted upon the cross-beams 2 and 2' are the usual seed-hoppers 30, the bottoms of which are provided with discharge apertures 31 that communicate with the knees 3. Fitted to the bottom of each apertured hopper is an apertured oscillatory feed-plate 32 having a slotted finger 33 that projects outwardly from the hopper. These fingers are each arranged to be engaged by arms 34, 34', that are rigidly secured to a shaft 35, which shaft is journaled in an ear 15" of the bracket 15, and a bracket 15''', the said shaft and its arms being held in one direction against a suitable stop by a coiled spring 36. The end of the arm 34 projects upwardly into the path of travel of the spurred links of the endless feed belt 24 and hence it is apparent that in the travel of the feed-belt when the corresponding spur engages said arm 34 it will in turn, through its connections, actuate both feed-plates, whereby a predetermined quantity of seed is discharged into the boot or knee.

While I have shown the working stretch of the endless chain 24 arranged to travel forwardly whereby the feed-plates are actuated in a clockwise direction in opposition to coiled springs, it is apparent that this movement may be reversed by change of gearing and the spring connections of the feed-plates, whereby said feed-plates will be operated in a reverse or anti-clockwise direction by the spurs 25 of the chain.

From the foregoing description it is obvious that should the feed mechanism be in gear connection with one of the traction wheels that is traveling in alinement with a hummock or depression that the said drive can be immediately freed from this particular wheel and transferred to the opposite wheel by manipulation of the clutch-lever 13. Hence the operator can shift the drive from one wheel to the other as the case may require. It is also observed that when movement of the lever 13 is effected either one or the other of the clutch members connected thereto are thrown into gear, whereby there is no appreciable lost motion in making the shift. Hence it is desirable when the machine is being transported from place to place and not in operation to provide means for disconnecting the gear mechanism from the checkrow mechanism and with this in view, as previously stated, the spanner lever 13' is arranged to uncouple or couple the driving sprocket-wheel 10 from the driven axle 8. It is also apparent that the seed may be checked off into rows within ordinary distances required for seeding certain products.

I claim:

In a check-row seeder having traction wheels, a frame mounted thereon, seeder hoppers carried by the frame, and oscillatory feed-plates mounted within the hoppers; the combination of an endless spur-carrying belt in juxtaposition to one of the hoppers, a driving gearing connecting the belts and traction wheels, an oscillatory shaft, and tappet-arms carried by the shaft for engagement with the feed-plates, one of the arms being extended in the line of travel of the belt-spurs.

In testimony that I claim the foregoing I have hereunto set my hand at Calvary in the county of Fond du Lac and State of Wisconsin in the presence of two witnesses.

MICHAEL MOLITOR.

Witnesses:
 JOHN L. BEAN,
 JOS. BEAN.